(12) United States Patent
Jang et al.

(10) Patent No.: US 8,484,011 B2
(45) Date of Patent: Jul. 9, 2013

(54) MULTILINGUAL DIALOGUE SYSTEM AND CONTROLLING METHOD THEREOF

(75) Inventors: Jun Won Jang, Yongin-si (KR); Ki Cheol Park, Hwaseong-si (KR); Tae Sin Ha, Seoul (KR); Woo Sup Han, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 718 days.

(21) Appl. No.: 12/591,734

(22) Filed: Nov. 30, 2009

(65) Prior Publication Data

US 2010/0174523 A1 Jul. 8, 2010

(30) Foreign Application Priority Data

Jan. 6, 2009 (KR) .................. 10-2009-0000821

(51) Int. Cl.
*G06F 17/28* (2006.01)

(52) U.S. Cl.
USPC .................. 704/2; 704/9; 704/257; 704/270

(58) Field of Classification Search
USPC ............ 704/257, 259, 277, 270, 270.1, 1–10, 704/233, 235, 251, 255; 1/1
See application file for complete search history.

(56) References Cited

U.S. PATENT DOCUMENTS

| 6,594,658 B2 * | 7/2003 | Woods ................................. 1/1 |
| 6,615,172 B1 * | 9/2003 | Bennett et al. ................ 704/257 |
| 6,999,932 B1 * | 2/2006 | Zhou ............................ 704/277 |
| 2007/0179785 A1 * | 8/2007 | Herry et al. ................... 704/259 |

* cited by examiner

*Primary Examiner* — Huyen X. Vo
(74) *Attorney, Agent, or Firm* — Staas & Halsey LLP

(57) ABSTRACT

A multilingual dialogue system enabling a user to conduct dialogue in various languages, and a controlling method thereof. According to the multilingual dialogue system and the controlling method, reliability of the user's language can be evaluated, thereby coping with errors generated during dialogue.

19 Claims, 4 Drawing Sheets $$f(t) = (AMEV + LMEV\ 1 + LMEV\ 2 + CAEV) / 4$$
$$0 \leq AMEV \leq 1,\ 0 \leq LMEV\ 2 \leq 1,\ 0 \leq f(t) \leq 1$$
$$0 \leq LMEV\ 1 \leq 1,\ 0 \leq CAEV \leq 1$$

MULTILINGUAL DIALOGUE SYSTEM AND CONTROLLING METHOD THEREOF

CROSS-REFERENCE TO RELATED APPLICATIONS

This application claims the benefit of Korean Patent Application No. 10-2009-0000821, filed on Jan. 6, 2009 in the Korean Intellectual Property Office, the disclosure of which is incorporated herein by reference.

BACKGROUND

1. Field

One or more embodiments relates to a multilingual dialogue system and a controlling method thereof, and more particularly, to a multilingual dialogue system enabling application of various languages and a controlling method thereof.

2. Description of the Related Art

Recently, a variety of intelligent robots including housekeeping robots, assistant robots, and entertaining robots have been developed to substitute or assist the works of human beings.

With regard to the performance of the intelligent robot, a dialogue system enabling interactive communication between a human being and a machine has been considered as one of the most useful technologies. To this end, there has been ongoing research for application of the dialogue system to agents such as the robot.

Conventionally, in such a dialogue system, only one specific language has been applicable and this has caused much restriction in using various languages. Specifically, since a plurality of dialogue systems have to be structured corresponding to respective languages to apply various different languages, dialogue management systems should accordingly increase as the number of languages increases.

SUMMARY

Therefore, it is an aspect of one or more embodiments to provide a multilingual dialogue system enabling a dialogue in various languages between a speaking user and an agent, and a controlling method thereof.

It is another aspect of one or more embodiments to provide a multilingual dialogue system capable of coping with errors that may occur during a dialogue by evaluating the reliability with regard to the user's language.

Additional aspects and/or advantages will be set forth in part in the description which follows and, in part, will be apparent from the description, or may be learned by practice of the invention.

In accordance with one aspect of one or more embodiments, there is provided a multilingual dialogue system including a sound input unit to be input with sound of a language spoken by a user, a common dialogue module to produce dialogue contents to be supplied to the user in one common language, and a sound output unit to supply the user with the dialogue contents in the form of sound.

The multilingual dialogue system may further include a reliability evaluator to evaluate reliability of the dialogue contents.

The reliability evaluator may include an evaluation function generating unit to generate a numerical value indicating the reliability using a plurality of evaluation factors.

The evaluation function generating unit may generate a reliability evaluation function corresponding to the reliability according to a following equation:

$$f(t) = (AMEV + LMEV1 + LMEV2 + CAEV)/4$$

Here, AMEV refers to a value evaluating the user's language using a sound model, being set in a range between 0 and 1, LMEV1 refers to a value evaluating the user's language using a language model, being set in a range between 0 and 1, LMEV2 refers to a value evaluating the common language using an other language model, being set in a range between 0 and 1, and CAEV refers to a value evaluating the common language using a situation recognition model, being set in a range between 0 and 1.

The multilingual dialogue system may further include a key input unit for the user to designate the language spoken by the user.

The common dialogue module may include a language discerning unit to discern the language being spoken by the user.

The language discernment unit may apply a plurality of language models.

The plurality of language models may include a parallel phone recognition language model (PPRLM) and a Gaussian mixture model (GMM).

The common dialogue module may comprise a translator that translates texts in the user's language to texts in the common language and vice versa.

The common dialogue module may select dialogue contents based on the evaluated reliability.

In accordance with another aspect of one or more embodiments, there is provided a controlling method for a multilingual dialogue system, including inputting sound of a user's language, converting the input sound to texts using one common language and producing dialogue contents based on the texts in the common language, and supplying the user with the dialogue contents in the form of sound.

The user may directly designate the language spoken by the user.

A plurality of language models may be used to discern the language being spoken by the user.

The plurality of language models may include a PPRLM and a GMM.

Reliability of the dialogue contents may be numerically evaluated.

The reliability is evaluated using a sound model with respect to the user's language, a language model with respect to the user's language, an other language model with respect to the common model, and a situation recognition model with respect to the common language.

The dialogue contents may be selected based on the evaluated reliability.

As described above, according to the multilingual dialogue system in accordance with the embodiment of one or more embodiments, the user is able to dialogue in various languages. Furthermore, since the reliability of the dialogue contents is evaluated, errors in the dialogue can be coped with, accordingly improving user satisfaction of the product.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
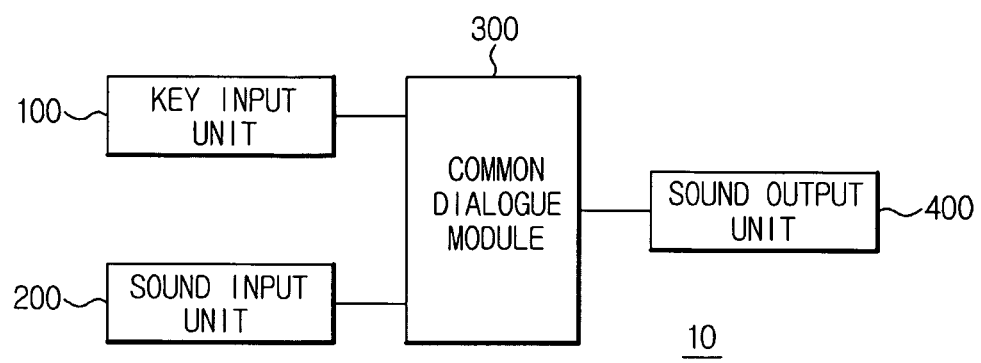
FIG. 1 illustrates a overall block diagram of a multilingual dialogue system according to an embodiment.

Reference will now be made in detail to embodiments, examples of which are illustrated in the accompanying drawings, wherein like reference numerals refer to the like elements throughout. The embodiments are described below to explain aspects of the present invention by referring to the figures.

First, a multilingual dialogue system 10 according to an embodiment is applicable to an intelligent robot, and further applicable to an information supply system where people using various languages share information or a home network system.

According to the multilingual dialogue system, a user may designate a language to speak or the system may determine the user's language by itself.

As shown in FIG. 1, the multilingual dialogue system 10 comprises a common dialogue module 300 enabling a dialogue in various languages between a human being and an agent.

A language to be used in the dialogue is designated through a key input unit 100. More specifically, as the user directly selects a key corresponding to the language to speak, an input command corresponding to the key is supplied to the common dialogue module 300. Therefore, the common dialogue module 300 can discern the designated language.

The multilingual dialogue system 10 further comprises a sound input unit 200 to input the user's voice to the common dialogue module 300, and a sound output unit 400 to output the dialogue contents to the user in the form of sound in accordance with sound signals supplied from the common dialogue module 300. A microphone may be used for the sound input unit 200, and a speaker may be used for the sound output unit 400.

Figure 2:
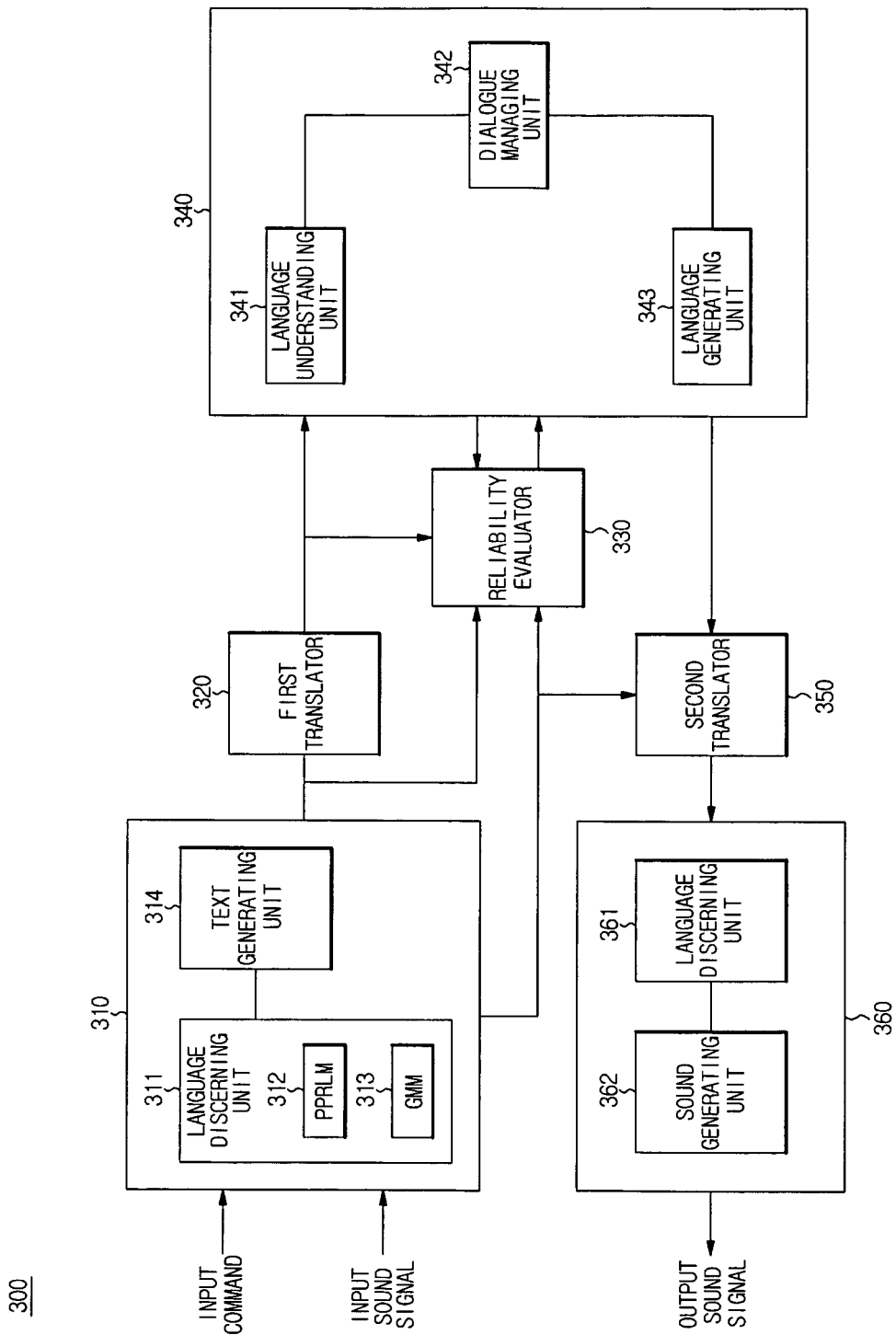
FIG. 2 illustrates a block diagram illustrating the specific structure of a common dialogue module of the multilingual dialogue system according to an embodiment.

Referring to FIG. 2, the common dialogue module 300 comprises a sound recognizer 310, a first translator 320, a reliability evaluator 330, a language analyzer 340, a second translator 350, and a sound generator 360.

The sound recognizer 310 includes a language discerning unit 311 discerning the language being spoken by the user among various languages, and a text generating unit 314 generating texts in the discerned language from the user's voice.

The language discerning unit 311 discerns the language designated by the user as the user's language. In case that the language is not specifically designated by the user, the language discerning unit 311 discerns the user's language by itself.

Here, more specifically, the language discernment can be successfully achieved only when discernment results by the language discerning unit 311 using two language models accord with each other. According to this embodiment, a parallel phone recognition language model (PPRLM) and a Gaussian mixture model (GMM) are used for the two language models 312 and 313. However, one or more embodiments are not limited in this way, allowing other types of language models to be used and the language discernment may be performed according to whether the discernment results by the language models accord with each other.

The language analyzer 340 manages the dialogue such as a question and a response on the basis of results of sound recognition, with regard to only one common language. If the user's language differs from the language being used in the language analyzer 340, the user's language is translated.

The first translator 320 translates texts of the user's language, generated by the text generation unit 314, to texts of the common language used in the language analyzer 340, regardless of the language spoken by the user. When the user's language and the common language are the same, the texts being input are transmitted directly to the language analyzer 340. Thus, the language analyzer 340 is supplied with the texts in the common language from the first translator 320.

The language analyzer 340 includes a language understanding unit 341 that parses the texts in the common language, a dialogue managing unit 342, and a language generating unit 343.

When the language understanding unit 341 supplies the dialogue managing unit 342 with the result of understanding the common language, the dialogue managing unit 342 determines the dialogue contents for questioning and responding to the user corresponding to the understanding result, and supplies the determined dialogue contents to the language generating unit 343. Therefore, the language generating unit 343 generates the texts in the common language corresponding to the dialogue contents.

The second translator 350 translates the texts in the common language to texts in the user's language. If the common language is the same as the user's language, the texts are transmitted directly to the sound generator 360.

A language discerning unit 361 of the sound generator 360 discerns the user's language and supplies the discernment result to a sound generating unit 362 of the sound generator 360. Then, the sound generating unit 362 converts the texts in the user's language to corresponding sound signals. The sound output unit 400 outputs the sound sign'als converted corresponding to the user's language, in the form of sound so that the user can hear the dialogue contents.

Meanwhile, an error may be generated during the sound recognition and the translation of the user's language to the common language and such a sound recognition error and a translation error would directly affect understanding of the language. That is, it is necessary to cope with the errors since the language may be wrongly understood or not understood at all depending on the errors.

In the one or more embodiments, to this end, the reliability evaluator 330 is provided to evaluate reliability of the dialogue contents so as to cope with the errors that may occur during the sound recognition and the translation of the user's language. The reliability evaluator 330 may include an evaluation function generating unit 331 (FIG. 3) that indicates the reliability by numbers.

Figure 3:
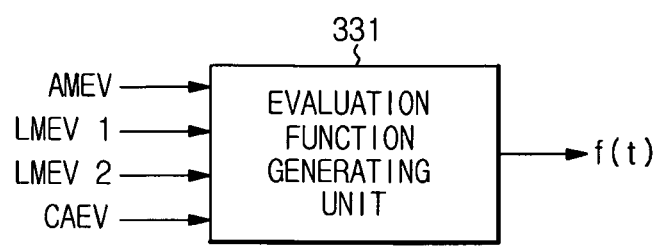
FIG. 3 illustrates a view explaining a reliability evaluation function according to an embodiment.
Figure 4:
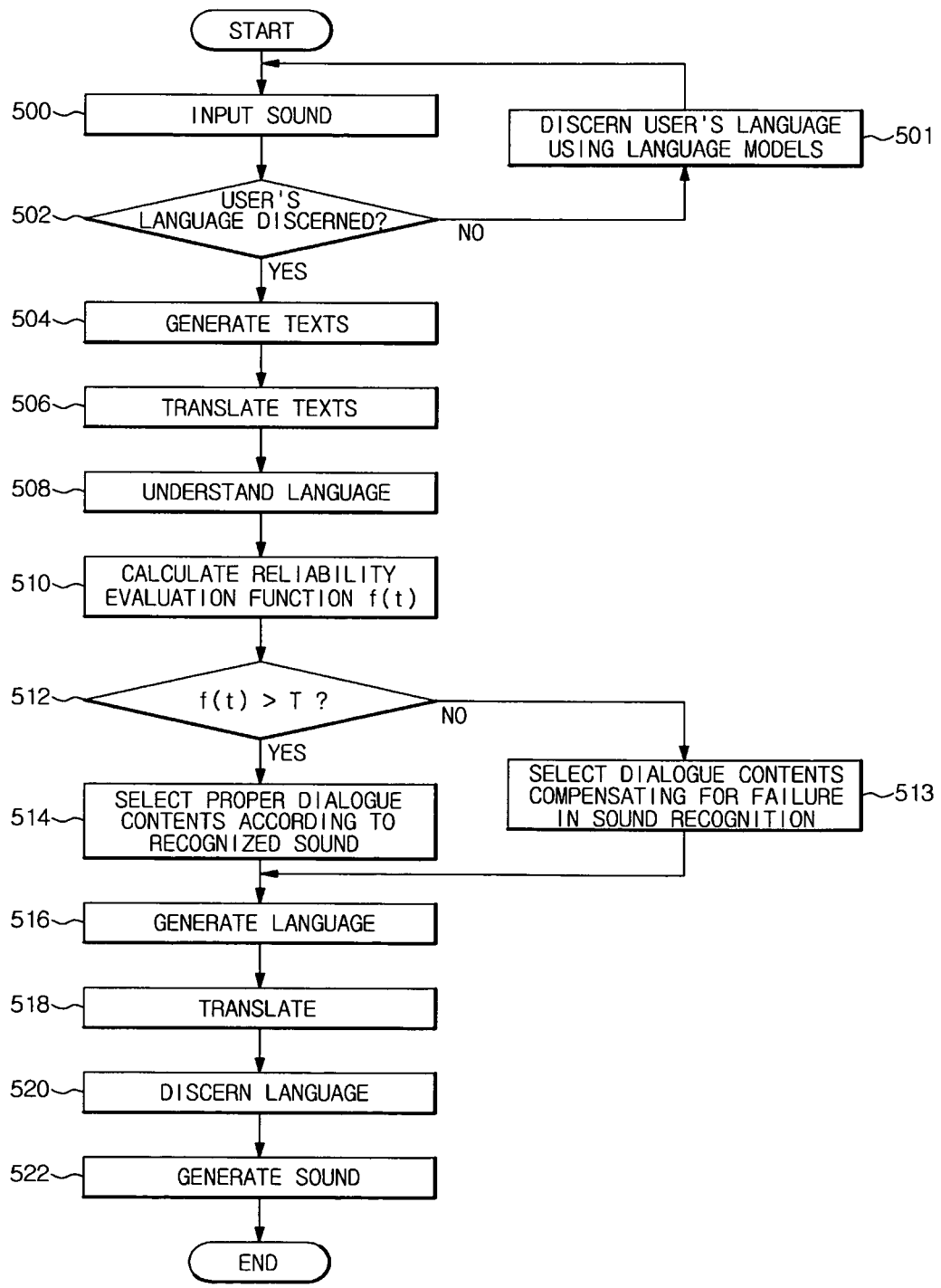
FIG. 4 illustrates a flowchart explaining a controlling method of the multilingual dialogue system according to an embodiment.

As shown in FIG. 3, more particularly, the evaluation function generating unit 331 generates a reliability evaluation function f(t) using four evaluation factors including acoustic model evaluation value (AMEV), language model evaluation value 1 (LMEV1), language model evaluation value 2 (LMEV2), and context awareness model evaluation value (CAEV). Although the reliability evaluation function f(t) is determined by calculating and averaging the four evaluation factors in this embodiment, one or more embodiments are not limited to this method but may vary the evaluation factors. The four evaluation factors are supplied from the sound recognizer 310 (FIG. 2), the first translator 320 (FIG. 2) and the language analyzer 340 (FIG. 2). The reliability evaluation function f(t) can be determined using Equation 1, for example.

$$f(t)=(AMEV+LMEV1+LMEV2+CAEV)/4 \quad \text{Equation 1}$$

Here, the AMEV referring to a value evaluating the user's language using a sound model is set in a range between 0 and 1. The LMEV1 which is a value evaluating the user's language using a language model is set in a range between 0 and 1. The LMEV2 which is a value evaluating the common language using an other language model is set in a range between 0 and 1. Last, the CAEV is set in a range between 0 and 1, as a value evaluating the common language using a situation recognition model.

The AMEV which is the first evaluation factor indicates a language recognition degree by analyzing sound of vowels and consonants, considering frequency, amplitude and time of the sound input by the user. For example, words "bit" and "kit" have different pronunciations that can be discriminated by sound.

The LMEV1 and LMEV2 which are the second and the third evaluation factors numerically indicate degrees of natural usage and grammar of the language. For example, in a sentence "I ( ) cooked rice", a word "eat" is natural to fill in the blank whereas a word "drink" is not.

The CAEV which is the fourth evaluation factor numerically indicates how properly the dialogue contents suit the situation. For example, in case of a dialogue between a housekeeping robot installed in a restaurant and a customer, a dialogue "I eat rice" is naturally predictable. However, a dialogue "I cook rice" is improbable in that case, although this dialog has no problem in terms of usage and grammar.

The evaluation function generating unit 331 evaluates the language with the four evaluation factors and converts the evaluation results to numerical values. In addition, the evaluation function generating unit 331 outputs the reliability evaluation function f(t) by calculating the values.

Referring again to FIG. 2, when the evaluation function f(t) is greater than a threshold value T, the dialogue managing unit 342 considers the sound recognition error and the translation error to be acceptable and normal. In this case, the dialogue managing unit 342 produces the dialogue contents to respond to the user's question or to ask a question of the user. If the evaluation function f(t) is not greater than the threshold value T, then an error occurs and the dialogue managing unit 342 produces the dialogue contents to inform the user that it is difficult to manage the dialogue properly.

When the dialogue contents are produced, the texts in the common language are generated and converted to the texts in the user's language. Next, the sound signals corresponding to the texts in the user's language are generated and output in the form of sound.

Hereinafter, a controlling method for the multilingual dialogue system according to an embodiment will be explained.

When the system starts, the user can designate a language to speak through the key input unit 100 (FIG. 1). However, the language designation is not compulsory.

According to an embodiment, the user and the agent such as a robot equipped with the multilingual dialogue system 10 (FIG. 1) are able to dialogue with each other by sound. Those processes will be explained in detail.

Referring to FIGS. 1, 2 and 5, the user gives a command by voice, that is, by sound. Here, the sound command may contain a command for the robot to perform assigned tasks or services. Then, in operation 500, the sound input unit 200 supplies the sound signals in the user's language to the sound recognizer 310. The user's language could be any one of a plurality of languages.

In case that the language is not designated by the user, in operation 501, the language discerning unit 311 discerns the language using, for example, the two language models 312 and 313. When the discernment results accord with each other, the language discerning unit 311 considers the corresponding language as the user's language.

In operation 502, when the user designated a specific language or when the user's language has been discerned by the language discerning unit 311 in operation 501, the language discerning unit 311 supplies the discernment results to the text generating unit 314. In operation 504, the text generating unit 314 generates the texts in the user's language as discerned, and outputs the texts to the first translator 320.

The first translator 320 translates the texts in the user's language to the texts in the common language being used by the available language analyzer 340, and transmits the common language texts to the language understanding unit 341. In operation 506, when the user's language is the common language, the texts are directly transmitted without translation.

In operation 508, the language understanding unit 341 supplies the results of understanding the common language to the dialogue managing unit 342.

In operation 510, during the language understanding, the reliability evaluator 330 calculates the reliability evaluation function f(t) determining the degree of the error that may be generated during the sound recognition and the translation of the user's language. As shown in FIG. 3, more specifically, the evaluation function generating unit 331 generates a reliability evaluation function f(t) by calculating the four evaluation factors. The reliability evaluation function f(t) is then supplied to the dialogue managing unit 342.

In operation 512, the dialogue managing unit 342 determines the dialogue contents for responding to or questioning the user according to the understanding results by the language understanding unit 341 in consideration of the reliability evaluation function f(t) supplied from the reliability evaluator 330. In operation 513, when the reliability evaluation function f(t) is not greater than the threshold value T, it is determined that an error occurs. Therefore, in this case, the dialogue contents such as "I'm sorry. I did not understand. Would you tell me again?" are selected to compensate for failure in the sound recognition.

In operation 514, when the reliability evaluation function f(t) is greater than the threshold value T, the sound recognition error and the translation error are considered to be normal. In this case, the dialogue contents are selected properly according to the recognized sound.

Upon selection of the dialogue contents, the language generating unit 343, in operation 516, generates the texts in the common language corresponding to the dialogue contents, and the second translator 350, in operation 518, translates the common language texts to the texts in the user's language.

Next, in operation 520, the language discerning unit 361, being supplied with the texts in the user's language, discerns the user's language and supplies the discernment result to the sound generating unit 362. Accordingly, in operation 522, the sound generating unit 362 converts the texts in the user's language into the sound signals that are to be output in the sound form through the sound output unit 400. Therefore, the user is able to continue the dialogue by listening to the dialogue contents.

In addition to the above described embodiments, example embodiments can also be implemented through computer readable code/instructions in/on a medium, e.g., a computer readable medium, to control at least one processing element to implement any above described embodiment. The medium can correspond to medium/media permitting the storing or transmission of the computer readable code.

The computer readable code can be recorded or transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media. The media may also be a distributed network, so that the computer readable code is stored or transferred and executed in a distributed fashion. Still further, as only an example, the processing element could include a processor or a computer processor, and processing elements may be distributed or included in a single device.

In addition to the above described embodiments, example embodiments can also be implemented as hardware, e.g., at least one hardware based processing unit including at least one processor capable of implementing any above described embodiment.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A multilingual dialogue system comprising:
   a sound input unit to be input with sound of a language spoken by a user;
   a common dialogue module to produce dialogue contents to be supplied to the user by translating text of the input sound into a common language; and
   a sound output unit to selectively supply the user with the dialogue contents in the form of sound, based on a degree of error of the dialogue contents in the common language.

2. The multilingual dialogue system according to claim 1, further comprising a reliability evaluator to evaluate reliability of the dialogue contents, based on the degree of error of the dialogue contents.

3. The multilingual dialogue system according to claim 2, wherein the reliability evaluator includes an evaluation function generating unit to generate a numerical value indicating the reliability using a plurality of evaluation factors.

4. The multilingual dialogue system according to claim 3, wherein the evaluation function generating unit generates a reliability evaluation function corresponding to the reliability according to:

$f(t)=(AMEV+LMEV1+LMEV2+CAEV)/4$ wherein, AMEV refers to a value evaluating the user's language using a sound model, being set in a range between 0 and 1, LMEV1 refers to a value evaluating the user's language using a language model, being set in a range between 0 and 1, LMEV2 refers to a value evaluating the common language using an other language model, being set in a range between 0 and 1, and CAEV refers to a value evaluating the common language using a situation recognition model, being set in a range between 0 and 1.

5. The multilingual dialogue system according to claim 2, wherein the common dialogue module selects dialogue contents based on the evaluated reliability.

6. The multilingual dialogue system according to claim 1, further comprising a key input unit for the user to designate the language spoken by the user.

7. The multilingual dialogue system according to claim 1, wherein the common dialogue module includes a language discerning unit to discern the language being spoken by the user.

8. The multilingual dialogue system according to claim 7, wherein the language discernment unit applies a plurality of language models.

9. The multilingual dialogue system according to claim 8, wherein the plurality of language models include a parallel phone recognition language model (PPRLM) and a Gaussian mixture model (GMM).

10. The multilingual dialogue system according to claim 1, wherein the common dialogue module comprises a translator that translates texts in the user's language to texts in the common language and vice versa.

11. The multilingual dialogue system according to claim 1, wherein the degree of error of the dialogue contents is based on a reliability evaluation function such that the dialogue contents are provided to the user when the reliability evaluation function is greater than a threshold value.

12. The multilingual dialogue system according to claim 1, wherein when the language spoken by the user is the same as the common language, then the translated texts are directly analyzed.

13. A controlling method for a multilingual dialogue system, comprising:
    inputting, by a processor, sound of a user's language;
    converting, by a processor, the input sound to texts using one common language and producing dialogue contents based on the texts in the common language; and
    supplying, selectively, the user with the dialogue contents in the form of sound, based on a degree of error of the dialogue contents in the common language.

14. The controlling method according to claim 13, wherein the user directly designates the language spoken by the user.

15. The controlling method according to claim 13, wherein a plurality of language models are used to discern the language being spoken by the user.

16. The controlling method according to claim 15, wherein the plurality of language models include a PPRLM and a GMM.

17. The controlling method according to claim 13, wherein reliability of the dialogue contents is numerically evaluated.

18. A controlling method for a multilingual dialogue system, comprising:
    inputting, by a processor, sound of a user's language;
    converting, by a processor, the input sound to texts using one common language and producing dialogue contents based on the texts in the common language; and
    supplying the user with the dialogue contents in the form of sound,
    wherein reliability of the dialogue contents is numerically evaluated, and
    wherein the reliability is evaluated using a sound model with respect to the user's language, a language model with respect to the user's language, an other language model with respect to the common model, and a situation recognition model with respect to the common language.

19. The controlling method according to claim 17, wherein the dialogue contents are selected based on the evaluated reliability.

* * * * *

UNITED STATES PATENT AND TRADEMARK OFFICE
CERTIFICATE OF CORRECTION

PATENT NO. : 8,484,011 B2
APPLICATION NO. : 12/591734
DATED : July 9, 2013
INVENTOR(S) : Jun Won Jang et al.

It is certified that error appears in the above-identified patent and that said Letters Patent is hereby corrected as shown below:

In the Claims

In Column 7, Line 49 (Approx.), In Claim 4, delete "LMEV1refers" and insert -- LMEV1 refers --, therefor.
In Column 8, Line 26, In Claim 13, delete "inputting, by a processor," and insert -- inputting --, therefor.
In Column 8, Line 45, In Claim 18, delete "inputting, by a processor," and insert -- inputting --, therefor.

Signed and Sealed this
Eighteenth Day of February, 2014

Michelle K. Lee
*Deputy Director of the United States Patent and Trademark Office*